United States Patent
Miki et al.

(10) Patent No.: US 11,090,867 B2
(45) Date of Patent: Aug. 17, 2021

(54) MANUFACTURING METHOD OF THREE-DIMENSIONAL SHAPED OBJECT AND ADDITIVE MANUFACTURING APPARATUS USED THEREFOR

(71) Applicant: CANON KABUSHIKI KAISHA, Tokyo (JP)

(72) Inventors: Tsutomu Miki, Komae (JP); Koh Kamachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 536 days.

(21) Appl. No.: 15/873,105

(22) Filed: Jan. 17, 2018

(65) Prior Publication Data
US 2018/0207871 A1 Jul. 26, 2018

(30) Foreign Application Priority Data
Jan. 25, 2017 (JP) .............................. JP2017-011509

(51) Int. Cl.
*B29C 64/268* (2017.01)
*B29C 64/153* (2017.01)
(Continued)

(52) U.S. Cl.
CPC ............ *B29C 64/268* (2017.08); *B22F 10/20* (2021.01); *B29C 64/153* (2017.08);
(Continued)

(58) Field of Classification Search
CPC ... B29C 64/268; B29C 64/153; B29C 64/393; B22F 3/1055; B22F 2301/00;
(Continued)

(56) References Cited

U.S. PATENT DOCUMENTS 8,057,731 B2 11/2011 Abe
9,592,554 B2 3/2017 Abe et al.
(Continued)

FOREIGN PATENT DOCUMENTS

| CN | 105903961 A | 8/2016 |
|---|---|---|
| WO | 2007/058160 A1 | 5/2007 |
| WO | 2012/160811 A1 | 11/2012 |

OTHER PUBLICATIONS

Extended European Search Report in European Application No. 18152469.5 (dated May 28, 2018).

(Continued)

*Primary Examiner* — Robert J Grun
(74) *Attorney, Agent, or Firm* — Venable LLP

(57) ABSTRACT

A manufacturing method of a three-dimensional shaped object includes a first step of depositing powder to form a powder layer, and a second step of scanning and irradiating an energy beam to the powder layer to melt and then solidifying the powder layer to form a solidified layer. The energy beam is irradiated to the powder layer corresponding to a contour area and an inner-solid area inside of the contour area. The first and second steps are alternately and repeatedly executed. The energy beam is scanned such that an irradiation starting point of the energy beam for forming an upper solidified layer does not overlap with an irradiation starting point of the energy beam for forming a lower solidified layer in a view from a lamination direction.

8 Claims, 13 Drawing Sheets

(51) Int. Cl.
 B22F 3/105 (2006.01)
 B29C 64/393 (2017.01)
 B33Y 10/00 (2015.01)
 B33Y 50/02 (2015.01)
 B22F 10/20 (2021.01)
 B33Y 30/00 (2015.01)
 B22F 10/30 (2021.01)

(52) U.S. Cl.
 CPC ............ B29C 64/393 (2017.08); B33Y 10/00 (2014.12); B33Y 50/02 (2014.12); *B22F 10/30* (2021.01); *B22F 2301/00* (2013.01); *B33Y 30/00* (2014.12); *Y02P 10/25* (2015.11)

(58) Field of Classification Search
 CPC . B22F 2003/1057; B33Y 10/00; B33Y 50/02; B33Y 30/00; Y02P 10/295
 See application file for complete search history.

(56) References Cited

U.S. PATENT DOCUMENTS

2007/0035069 A1 2/2007 Wust et al.
2010/0233012 A1 9/2010 Higashi et al.

OTHER PUBLICATIONS

A.A. Antonysamy et al, "Effect of Build Geometry on the β-grain Structure and Texture in Additive Manufacture of Ti—6Al—4V by Selective Electron Beam Melting," 84 Mater. Charact. 153-168 (Jul. 2013) (XP028736489).

W. J. Sames et al., "The Metallurgy and Processing Science of Metal Additive Manufacturing," 61(5) Int. Mater. Rev. 315-360 (Mar. 2016) (XP055398013).

Evren Yasa et al., "Investigation on Occurrence of Elevated Edges in Selective Laser Melting," 11th Annual International Solid Freeform Fabrication Symposium 2009, pp. 673-685 (Aug. 2009) (XP055475532).

Notification of Reasons for Refusal in Japanese Application No. 2017-011509 (dated Sep. 29, 2020).

PRIOR ART

PRIOR ART

MANUFACTURING METHOD OF THREE-DIMENSIONAL SHAPED OBJECT AND ADDITIVE MANUFACTURING APPARATUS USED THEREFOR

BACKGROUND OF THE INVENTION

Field of the Invention

The present invention relates to a manufacturing method of a three-dimensional shaped object using a so-called powder lamination melting method and to an additive manufacturing apparatus used therefor.

Description of the Related Art

Lately, development of a so-called 3-D printer, i.e., an additive manufacturing apparatus, is actively conducted, and various systems are being tried. For instance, various systems such as a heat fusion lamination shaping method, stereo-lithography using photo-hardening polymer, and a powder lamination melting method are known.

The powder lamination melting method is a method of forming a three-dimensional shaped object by repeating a step of layering base powder such as nylon resin, ceramics, and metal and a step of selectively melting a part of the powder layer by irradiating a laser beam. The powder lamination melting method using metal powder as a base material is started to be actively used lately as a method for manufacturing an article which is required to have high mechanical strength and favorable thermal conductivity.

For instance, WO2012/160811 discloses a manufacturing method for manufacturing a three-dimensional shaped object by irradiating a laser beam after layering base powder such as metal by using a squeegeeing blade.

While the laser beam is irradiated to the deposited powder layer to selectively melt in the powder lamination melting method, there is a case where a portion of a solidified part rises and an unintentional projection is generated after melting the powder layer, thus lowering forming accuracy of the shaped object. In a case where the projection is remarkable, there is a case where it is unable to continue the three-dimensional shaping process, i.e., an additive manufacturing process, because the projection interferes with the squeegeeing blade in layering the base powder.

In order to solve this problem, WO2012/160811 describes a method of providing a mechanism for cutting an upper surface of the raised solidified portion in the additive manufacturing apparatus and of continuing the additive manufacturing process with cutting the raised portion.

However, the provision of such cutting mechanism in the additive manufacturing apparatus not only complicates the apparatus but also causes such problems that cut pieces may trouble the subsequent manufacturing process and may prolong a time required for the additive manufacturing process by interposing such cutting process.

SUMMARY OF THE INVENTION

According to a first aspect of the present invention, a manufacturing method of a three-dimensional shaped object includes a first step of depositing powder to form a powder layer, and a second step of scanning and irradiating an energy beam to the powder layer to melt and then solidifying the powder layer to form a solidified layer. The energy beam is irradiated to a part of the powder layer corresponding to either one area among a contour area including a surface of the shaped object and an inner-solid area inside of the contour area in advance and the energy beam is irradiated to a part of the powder layer corresponding to another area later. The first and second steps are alternately and repeatedly executed to form a three-dimensional shaped object by laminating a plurality of solidified layers. The energy beam is scanned such that an irradiation starting point of the energy beam for forming an upper solidified layer among the plurality of laminated solidified layers does not overlap with an irradiation starting point of the energy beam for forming a lower solidified layer in a view from a lamination direction.

According to a second aspect of the present invention, an additive manufacturing apparatus for a three-dimensional shaped object includes a powder layer forming portion configured to deposit powder to form a powder layer, an energy beam irradiating portion configured to scan and irradiating an energy beam to the powder layer to form a solidified layer, and a controller configured to control the powder layer forming portion and the energy beam irradiating portion to form and laminate a plurality of solidified layers. The controller controls such that either one area among a contour area including a surface of the three-dimensional shaped object and an inner-solid area inside of the contour area in advance and such that another area is formed later. The energy beam irradiating portion scans the energy beam such that an irradiation starting point of the energy beam for forming an upper solidified layer among the plurality of solidified layers does not overlap with an irradiation starting point of the energy beam for forming a lower solidified layer in a view from a lamination direction.

Further features of the present invention will become apparent from the following description of exemplary embodiments with reference to the attached drawings.

DESCRIPTION OF THE EMBODIMENTS

Figure 11A:
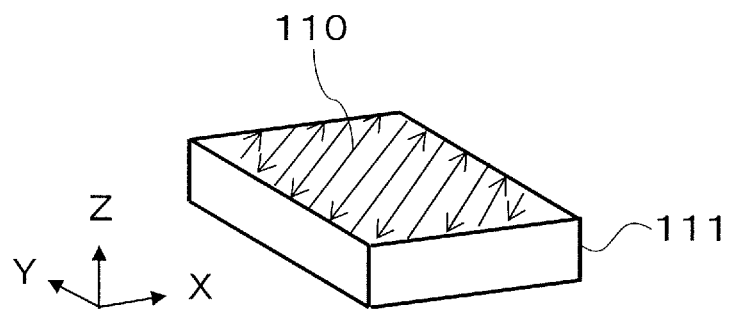
FIG. 11A is a schematic perspective view illustrating a prior art additive manufacturing method.
Figure 11B:
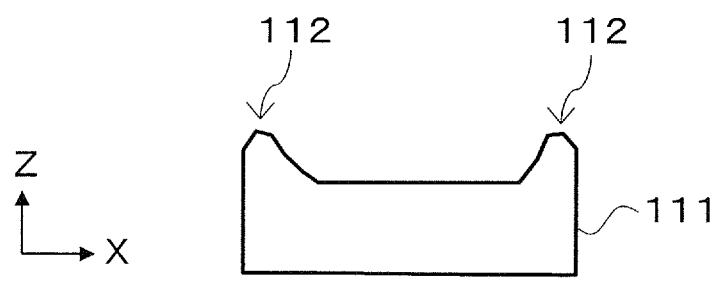
FIG. 11B is a schematic section view of a prior art three-dimensional shaped object.

During investigation of the abovementioned problem, the inventor found that the projection frequently occurs at an edge of the shaped object. That is, while a three-dimensional shaped object 111 is often formed by melting a powder layer by irradiating a light beam along scan lines 110 in parallel with a predetermined direction as illustrated in FIG. 11A, edges 112 of the three-dimensional shaped object 111 often rise with this method, causing the projections at the edge portions as illustrated in FIG. 11B.

While a cause of such projection is not exactly clarified, the following two factors may be involved in complex.

Figure 12:
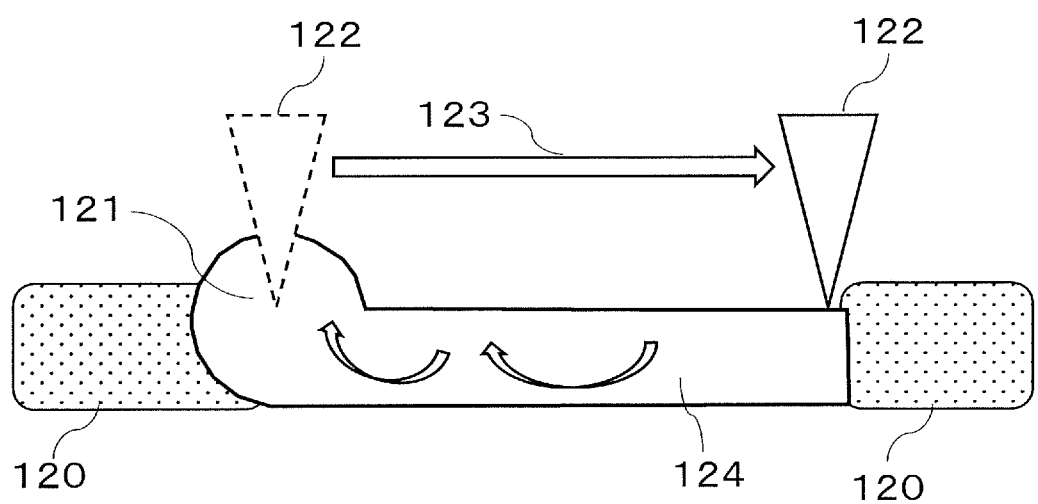
FIG. 12 is a schematic section view illustrating a bump at an irradiation starting point.

The first factor is that a molten powder layer is liable to be convexly raised at an irradiation starting point of the light beam. FIG. 12 illustrates this phenomenon. In FIG. 12, the powder layer is denoted by 120, the irradiation starting point of the light beam by 121, the light beam by 122, a scan direction of the light beam by 123, and a molten portion by 124. As the light beam 122 scans the powder layer 120 along the scanning direction 123, an irradiated part is heated up, melts and turns into a condition in which its fluidity is high. While temperature drops gradually from the irradiation starting point 121, i.e., a scanning uppermost upstream, in the molten part 124, the irradiation starting point 121 increases its surface tension as the temperature drops and tries to attract a downstream molten material whose temperature and fluidity are still high. Because a circumference of the irradiation starting point 121 is surrounded by the powder layer 120, the molten metal flown into the irradiation starting point has no place to escape, and as a result, the molten part at the irradiation starting point is raised convexly (referred to as a 'bump' hereinafter and the projection is what the bumps are accumulated). Such phenomenon is particularly remarkable in a case where a power of a laser beam to be irradiated is increased to enhance density of the shaped object.

Figure 13:
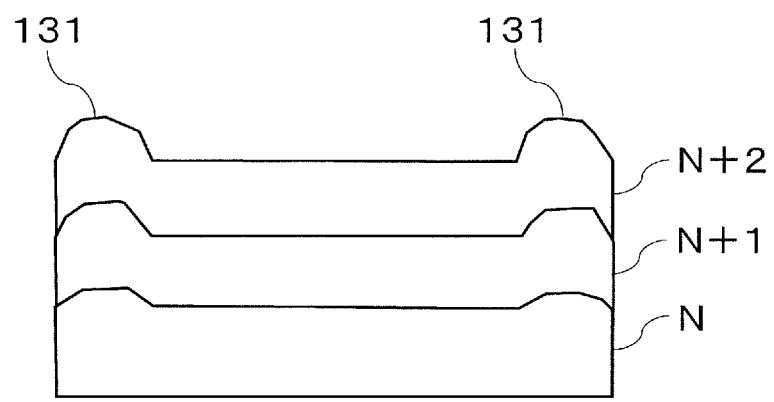
FIG. 13 is a schematic section view of the prior art three-dimensional shaped object.
Figure 13:
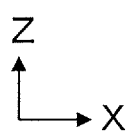

The second factor is that if the irradiation starting point is located at a same position in vertically overlapping layers in a plan view, bumps accumulate as the layers are accumulated, thus growing into a conspicuous convex shape. FIG. 13 illustrates this phenomenon and shows that the bumps 131 at the both end portions grow remarkably as a number of the layers increases. As illustrated schematically in FIG. 11A, the irradiation starting points and irradiation ending points of the scan lines are arrayed alternately in four sides of each layer of the three-dimensional shaped object 111. However, actually because the scan lines are extremely dense, a range of the bump of the irradiation starting point of a certain scan line extends to a neighboring scan line. Due to that, the projection is formed along the both ends of the three-dimensional shaped object 111 as illustrated in FIG. 11B.

Based on such analysis, the inventor devised a new light beam scanning method and came to invent a three-dimensional shaping method which suppresses the projection from being formed.

It is noted that in the following description, a case where powder is heated and melted is defined to be not only a case where all powder is heated to a fusion point or more but also a case where the heated powder includes a part sintered at temperature lower than the fusion point.

Still further, the term 'layer' in the following description refers to a part formed by one process in a case of forming a three-dimensional shaped object by accumulating solidified objects in a thickness direction by repeating the process of depositing and melting powder by irradiating a light beam by a plurality of times. While there is a case where a boundary between layers can be confirmed by a cross-sectional observation of the three-dimensional shaped object, there is also a case where the boundary between the layers cannot be clearly detected in such a case where homogeneity of molten parts is high.

First Embodiment

A manufacturing method of a three-dimensional shaped object and an additive manufacturing apparatus of a first embodiment of the present disclosure will be described with reference to the drawings.

Additive Manufacturing Apparatus

Figure 1:
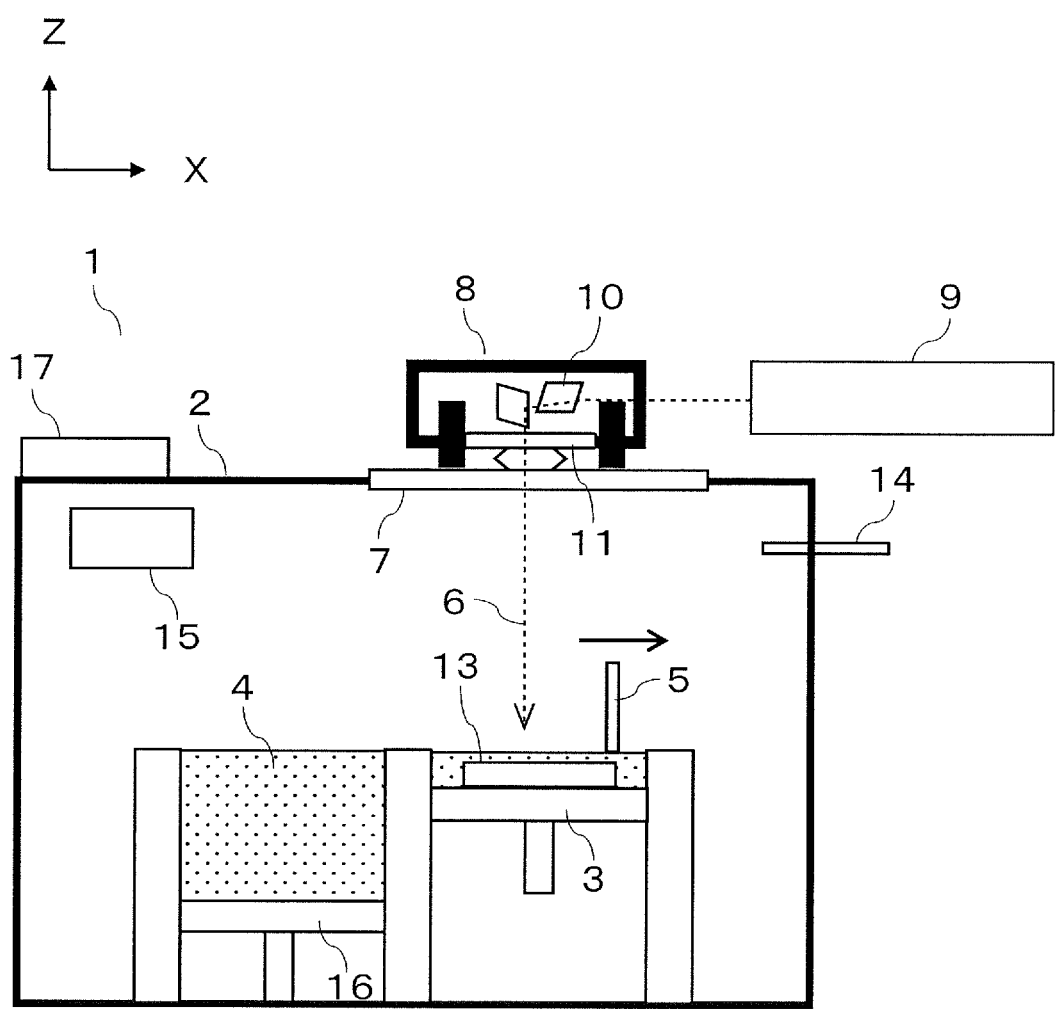
FIG. 1 is a schematic side view illustrating a configuration of an additive manufacturing apparatus according to an embodiment of the present disclosure.

Firstly, the additive manufacturing apparatus 1 used in the present embodiment will be described with reference to FIG. 1. FIG. 1 is a schematic side view illustrating an overall configuration of the additive manufacturing apparatus 1.

Within a chamber 2 having a gas inlet port 14, the additive manufacturing apparatus 1 includes a shaping stage 3 for forming a three-dimensional shaped object, a powder storage tank 4 for supplying powder, i.e., a raw material, and a squeegee 5 for depositing a powder layer on the shaping stage 3. A base plate not illustrated is mounted on the shaping stage 3 and a three-dimensional shaped object 13 is shaped on the base plate. Provided above the shaping stage 3 is an energy beam irradiating portion including a laser source 9, a scanning optical system 8 for scanning a laser beam 6 and a transmission window 7 through which the laser beam 6 is transmitted.

While a fiber laser of 1070 nm in wavelength (500 W of maximum output) is used as the laser source 9 in the present embodiment, the present disclosure is not limited to such laser source, and a laser source of another wavelength and another type may be adopted. A galvanic scanner 10 and a condenser lens 11 included in the scanning optical system 8 are optical devices that scans and condenses the laser beam 6 outputted from the laser source 9.

The additive manufacturing apparatus 1 also includes an operation panel 17 that permits an operator to operate the additive manufacturing apparatus 1. The operation panel 17 includes an input portion that enables the operator to give instructions to the additive manufacturing apparatus 1 and a display portion for displaying information to the operator. The input portion includes a keyboard and operation buttons. The display portion includes a display panel displaying operation states or the like of the additive manufacturing apparatus 1.

A control portion 15 is a computer for controlling operations of the additive manufacturing apparatus 1 and is communicable with the respective portions within the apparatus and with external devices.

Figure 2:
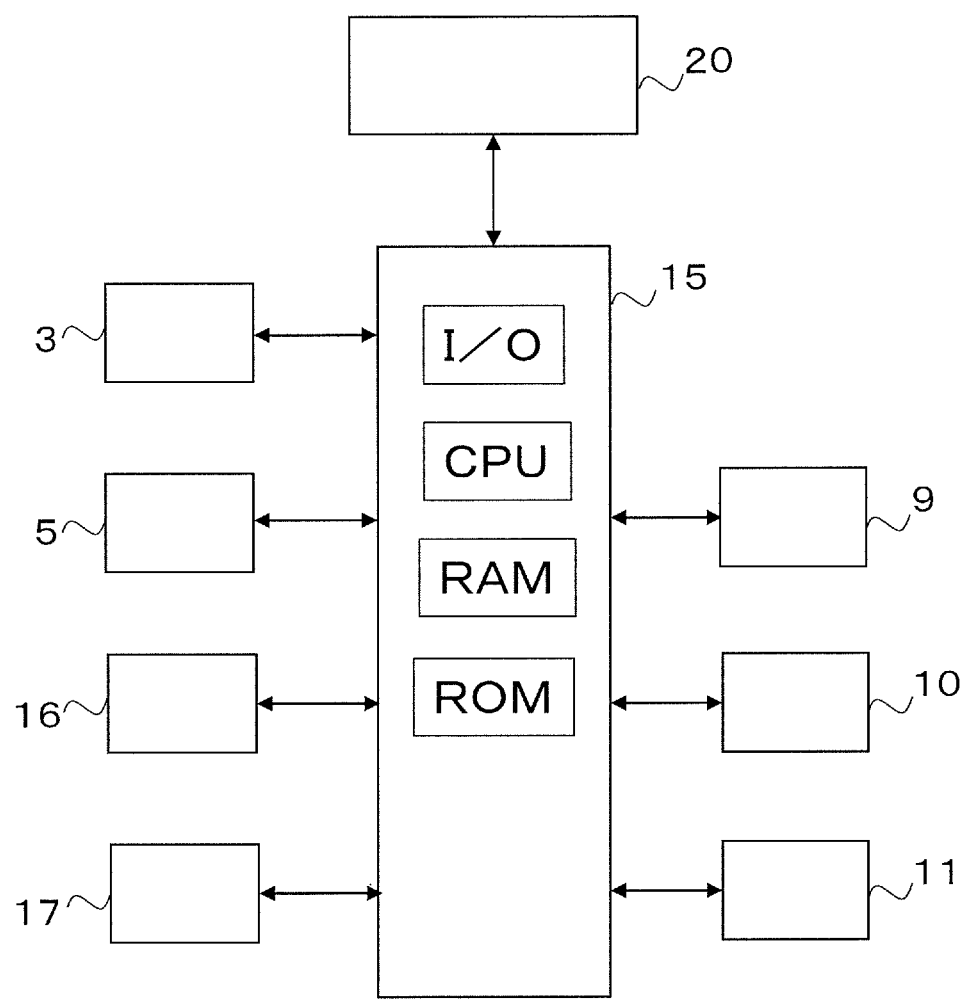
FIG. 2 is a control block diagram of the additive manufacturing apparatus of the embodiment.

FIG. 2 is a control block diagram of the additive manufacturing apparatus 1. The control portion 15 is a computer configured to control the operation of the additive manufacturing apparatus 1 and includes a CPU, a ROM, a RAM, I/O ports and others. The ROM stores an operation program of the additive manufacturing apparatus 1. The I/O ports are connected with an external device and networks to enable to input/output data necessary for the additive manufacturing with an external computer 20. The data necessary for the additive manufacturing includes profile data of a three-dimensional shaped object to be shaped, information concerning a material used for the shaping, and profile data of a molten layer per layer, i.e., a slice data. While the CPU within the control portion 15 prepares the slice data based on the profile data of the shaped object and stores in the RAM, the control portion 15 may receive the data from the external computer 20 and store in the RAM.

The control portion 15 is connected with the respective portions of the apparatus such as the shaping stage 3, the squeegee 5 serving as a powder layer forming portion, the lifter 16 within the powder storage tank 4, the operation panel 17, the laser source 9, the galvanic scanner 10, and the condenser lens 11 to control their operations to execute a process concerning the additive manufacturing.

Additive Manufacturing Process

Figure 3:
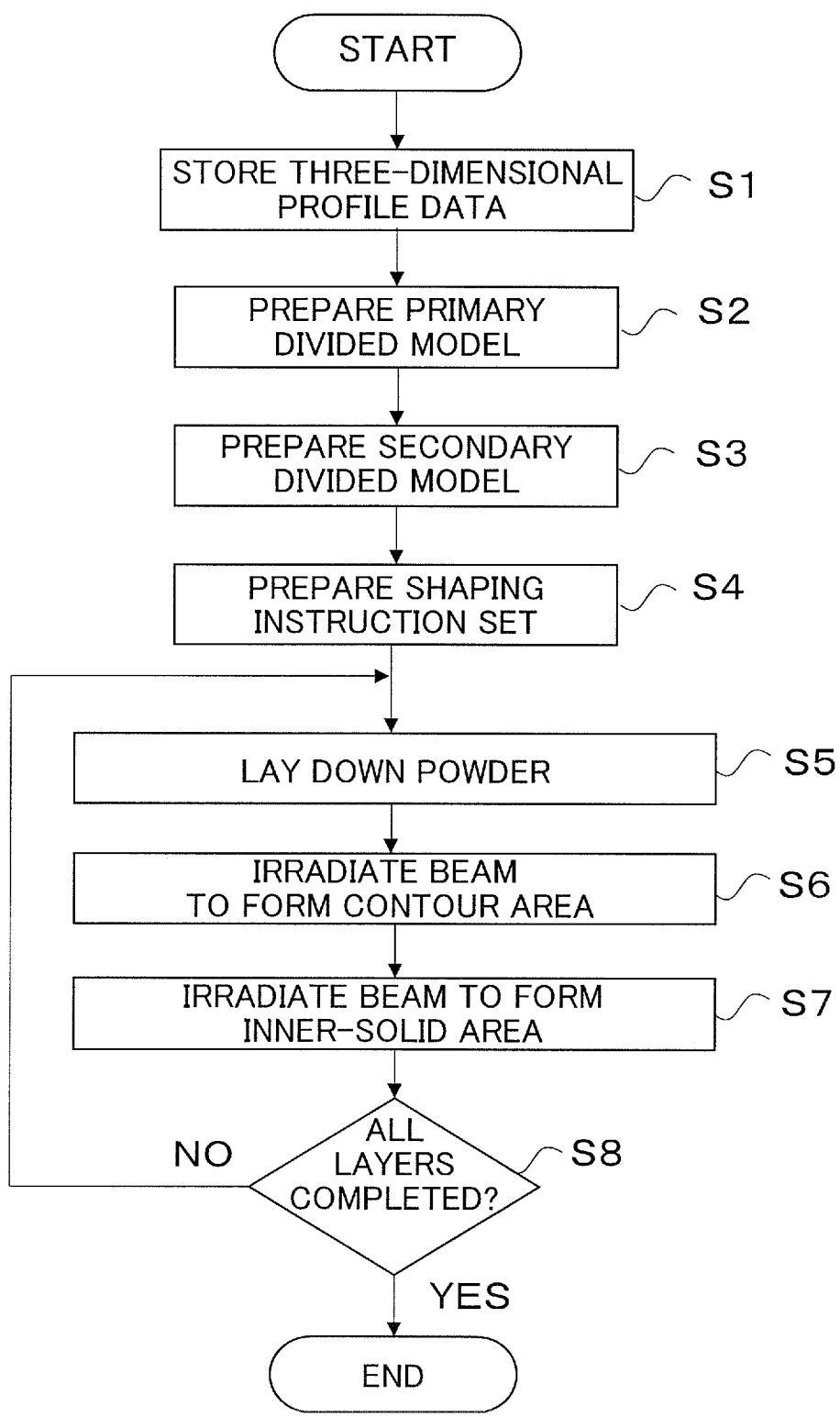
FIG. 3 is a flowchart of an additive manufacturing method of the embodiment.

Based on an instruction of the operator inputted from the operation panel 17, the control portion 15 controls each portion of the additive manufacturing apparatus 1 to execute each step of the additive manufacturing process. FIG. 3 is a flowchart illustrating a flow of the additive manufacturing process. It is noted that in the following description, there is a case where an object to be shaped, i.e., a shaped object, is referred to simply as an article.

On start of the additive manufacturing process, three-dimensional profile data of an article to be shaped is stored in the RAM of the control portion 15 in Step S1. The three-dimensional profile data may be one prepared by the external computer 20 or may be data prepared by another CAD apparatus or a three-dimensional profile data measuring apparatus and inputted through the network or a storage medium. While a STEP format, a Parasolid format, a STL format or the like is used as a format of the three-dimensional profile data, a type of the format is not limited as long as the format can express a three-dimensional profile as digital data.

Next, the CPU prepares profile data of each layer used in forming the article by laminating a plurality of layers based on the three-dimensional profile data in Steps S2 and S3.

In Step S2, the CPU of the control portion 15 uses an arithmetic unit included therein and a three-dimensional profile data editing software stored in the ROM to prepare a primary divisional model, i.e., the slice data, obtained by dividing a three-dimensional model profile by a thickness of one layer which can be laminated by the additive manufacturing apparatus of the present embodiment.

Figure 4A:
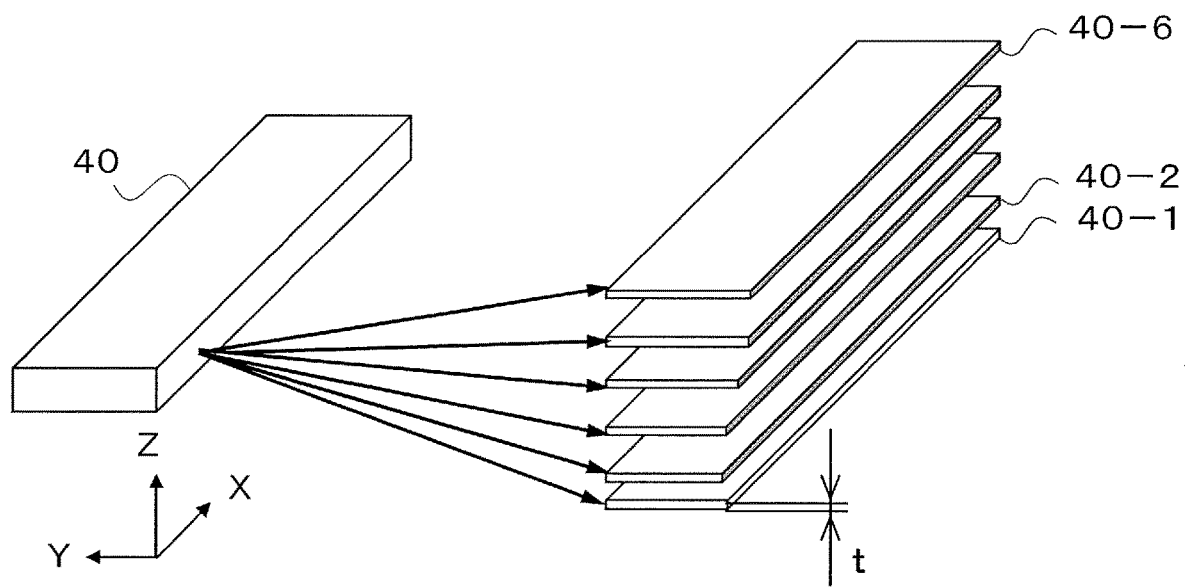
FIG. 4A is a perspective view illustrating a primary divided model of the embodiment.

For instance, in a case where the article to be shaped is a rectangular parallelepiped as illustrated in FIG. 4A, a three-dimensional model 40 is divided by a thickness t of one layer that can be laminated by the additive manufacturing apparatus. Here, the three-dimensional model 40 is divided into six layers for convenience of the description, and the respective layers will be referred to, sequentially from the lowest layer, as a 40-1 layer, a 40-2 layer and so on to a 40-6 layer.

In Step S3, the CPU of the control portion 15 prepares a secondary divided model in which each layer of the 40-1 through 40-6 layers of the primary divided model is divided into a part including a surface, i.e., a contour line, of the three-dimensional shaped object and an area inscribing the part including the contour line. It is noted that the part including the surface, i.e., the contour line, of the three-dimensional shaped object will be referred to as a contour area, and the area inscribing the contour area will be referred to as an inner-solid area in the following description.

Figure 4B:
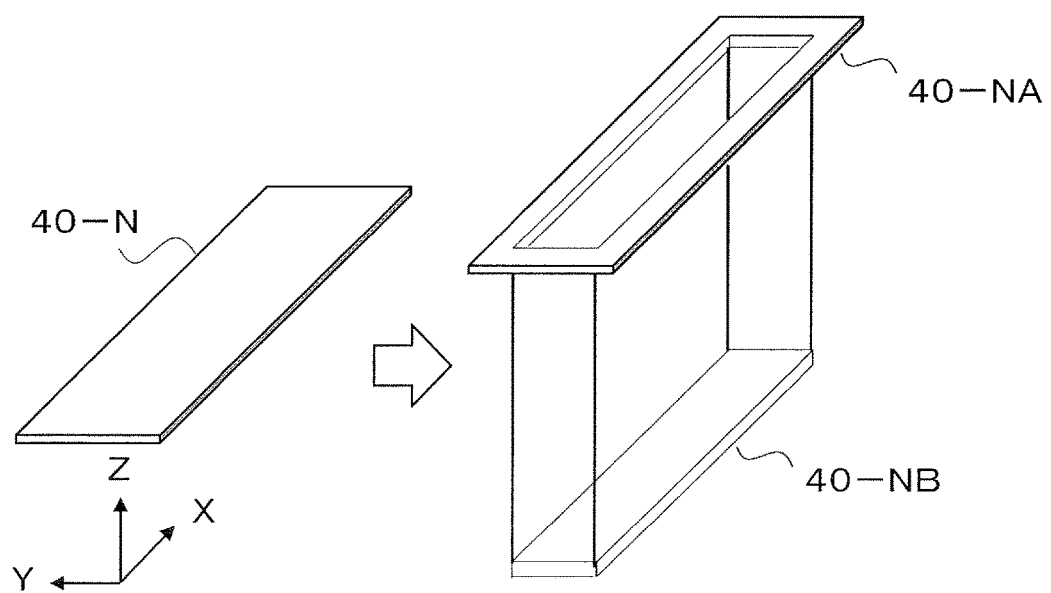
FIG. 4B is a perspective view illustrating a secondary divided model of the embodiment.

For instance, as for a 40-N layer which is a N-th layer of the primary divided model (N is any one of 1 to 6) as illustrated in FIG. 4B, although an outer circumferential portion of the layer includes a contour line of an outer surface of the three-dimensional model 40, an inner part does not constitute the contour of the surface of the three-dimensional model 40. Then, the CPU of the control portion 15 divides the 40-N layer into a contour area 40-NA layer and an inner-solid area 40-NB layer.

Here, the contour area 40-NA layer is a part including the outer surface, i.e., a side surface, of the article, and the inner-solid area 40-NB layer is a part in contact with the contour area 40-NA layer and is disposed inside thereof.

Figure 5A:
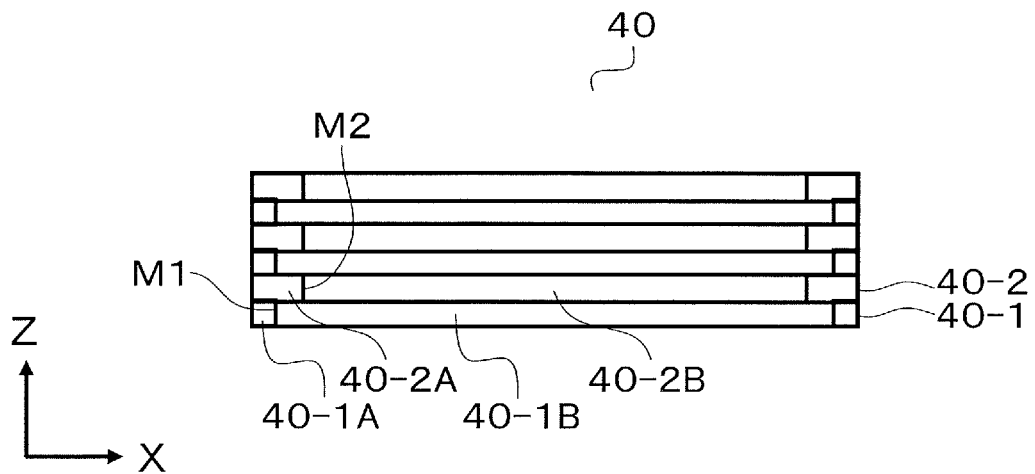
FIG. 5A is a schematic section view illustrating the secondary divided model of the embodiment.

Next, shapes of the contour area and the inner-solid area of each layer of the layers 40-1 through 40-6 will be described. FIG. 5A is a section view illustrating a section of the three-dimensional model 40 seen in a case where the whole three-dimensional model 40 is divided in a direction of a X-Z plane in order to describe the shapes of the respective layers of the secondary divided model.

Figure 5B:
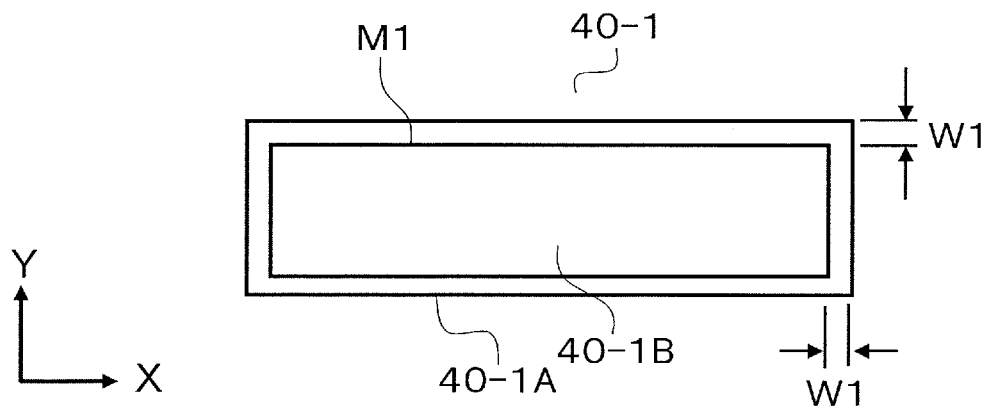
FIG. 5B is a plan view illustrating one layer of the secondary divided model of the embodiment.
Figure 5C:
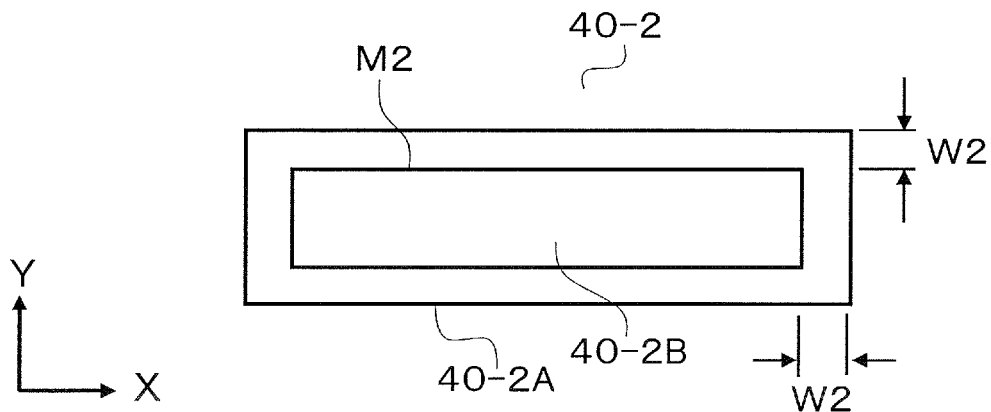
FIG. 5C is a plan view illustrating another one layer of the secondary divided model of the embodiment.

The shapes of the contour area and the inner-solid area are differentiated among the even-number-th and odd-number-th layers as illustrated in FIG. 5A. This arrangement will be described by exemplifying the 40-1 layer and the 40-2 layer with reference to FIGS. 5B and 5C. FIGS. 5B and 5C are plan views of the 40-1 layer and the 40-2 layer seen from an upper direction of a lamination direction of the layers. As illustrated in FIGS. 5B and 5C, widths of the areas of the contour area 40-1A of the 40-1 layer and the contour area 40-2A of the 40-2 layer are differentiated, i.e., W1<W2.

This arrangement is made such that the boundary lines of the contour area and the inner-solid area do not overlap among the laminated upper and lower layers when seen from the upper part of the lamination direction. In the case as illustrated in FIGS. 5A through 5C, the widths of the contour areas are differentiated as W1<W2 such that the boundary line M1 does not overlap with the boundary line M2 when seen from the upper part of the lamination direction. In the case of FIGS. 5A through 5C, a distance D between the boundary line M2 of the upper layer and the boundary line M1 of the lower layer can be expressed as D=W2−W1 when seen from the upper part of the lamination direction.

Although the two types of widths of W1 and W2 are used and the widths of the contour areas of the even-number-th and odd-number-th layers are differentiated in the case of FIGS. 5A through 5C, the method for arranging such that the boundary lines of the contour areas and the inner-solid areas do not overlap among the upper and lower layers is not limited to that described above. For instance, as for the widths of the contour areas, three types of widths W0<W1<W2 may be used and may be repeatedly set sequentially from the under layer as W0, W1, W2, W1, W0 and so on.

It is desirable to set the distance D between the boundary line of the upper layer and the boundary line of the lower layer to an appropriate distance in order to suppress the bumps generated at the irradiation starting point of the energy beam described with reference to FIG. 12 from accumulating as described with reference to FIG. 13.

For example, the distance D is preferable to be a spot diameter or more in irradiating the energy beam to the powder layer in order to avoid the irradiation starting points of the energy beams from overlapping at the upper and lower layers. Or, the distance D is preferable to be 0.2 mm or more because there is a case where the bump is generated with a diameter of four to five times of the spot diameter of the energy beam at the irradiation starting point and it is preferable to suppress ranges of the bumps from overlapping with each other.

Figure 6:
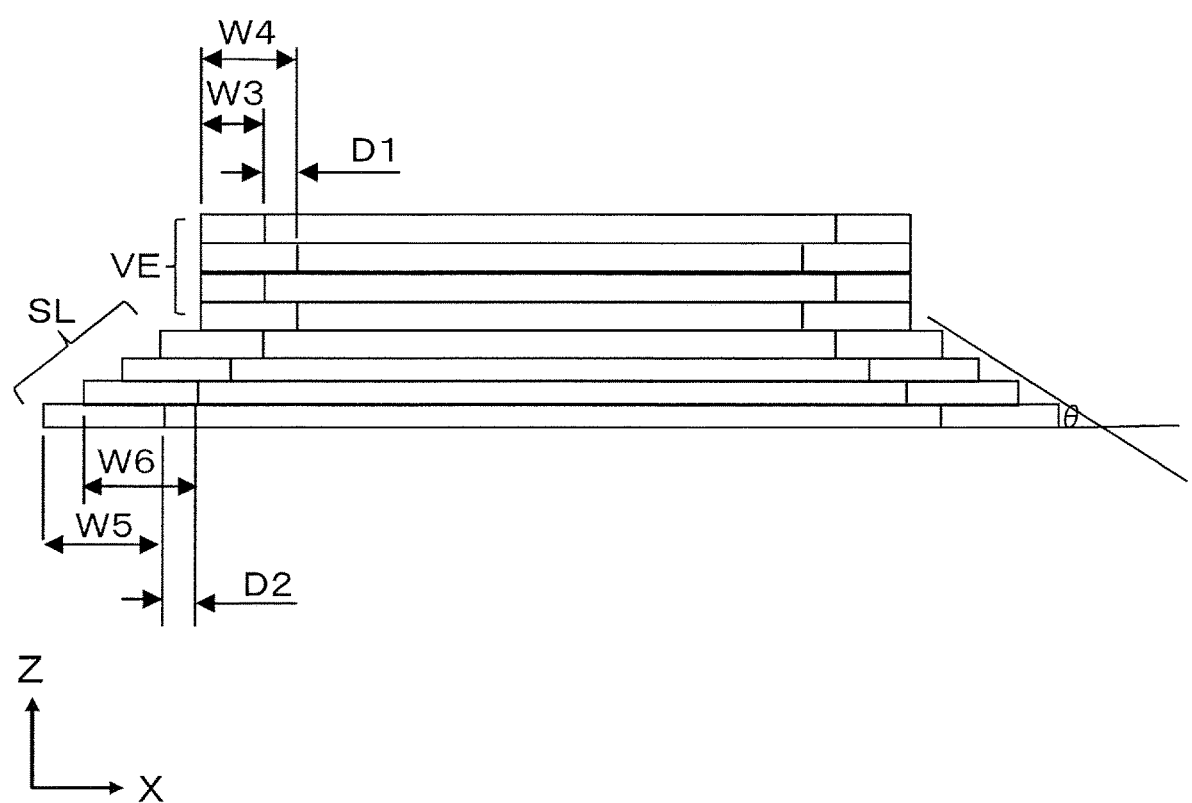
FIG. 6 is a schematic section view illustrating the secondary divided model of the embodiment.

Here, the method for separating the boundary lines of the contour area and the inner-solid area so as not to overlap among the upper and lower layers will be described with reference to another case. FIG. 6 is a schematic section view illustrating a secondary divided model of an article in which a column having a vertical side surface VE is integrated above a truncated cone having a slant surface SL.

The columnar part having the vertical side surface VE is configured such that contour areas having two types of widths of W3 and W4 are alternately laminated and a boundary line of an upper layer is separated from a boundary line of a lower layer by a distance D1 with a similar concept with the case of FIG. 5.

Meanwhile, as for the part of the truncated cone having the slant surface SL, there is a case where it is unnecessary to differentiate a width of a width W5 of an contour area of a lower layer from that of a width W6 of a contour area of an upper layer. That is, even if the widths of the contour areas of the upper and lower layers are equalized, i.e., W5=W6, boundary lines are separated by a distance D2=t/tan θ, where θ is an angle formed between the slant surface SL and a main surface of a solidified layer, i.e., a plane in parallel with a XY plane, and 't' is a thickness of one layer. Therefore, if t/tan θ is greater than the spot diameter of the energy beam or 0.2 mm, the widths W5 and W6 of the contour areas of the upper and lower layers can be equalized. In a case where t/tan θ is smaller than the spot diameter of the energy beam or 0.2 mm, it is desirable to differentiate the widths W5 and W6 of the contour areas of the upper and lower layers to assure the distance separating the boundary lines among the upper and lower layers. This arrangement is applicable not only to the case of the truncated cone but also to a slant surface part of any article.

Next, the CPU of the control portion 15 prepares an instruction set necessary for the additive manufacturing apparatus to shape a three-dimensional model with reference to the secondary divided model prepared in Step S3 and stores the set in the RAM.

The instruction set includes operational procedures of the respective portions for forming the first through the sixth layers. More specifically, the instruction set includes operation instructions of the squeegee 5 and the shaping stage 3 for depositing the powder layer and operation instructions for controlling the scanning optical system 8 and the laser source 9 for scanning the energy beam.

In the present embodiment, after depositing the powder layer, irradiating the energy beam to the contour area of the relevant layer to melt and to solidify, the energy beam is then irradiated to the inner-solid area of the relevant layer to melt and to solidify. However, in some cases, the procedure may be changed so as to irradiate the energy beam to the contour area after irradiating the energy beam to the inner-solid area first. In such a case, Step S6 described later is switched with Step S7. In short, either one of the contour area and the inner-solid area of each layer is formed first or the other one is formed later.

Figure 7A:
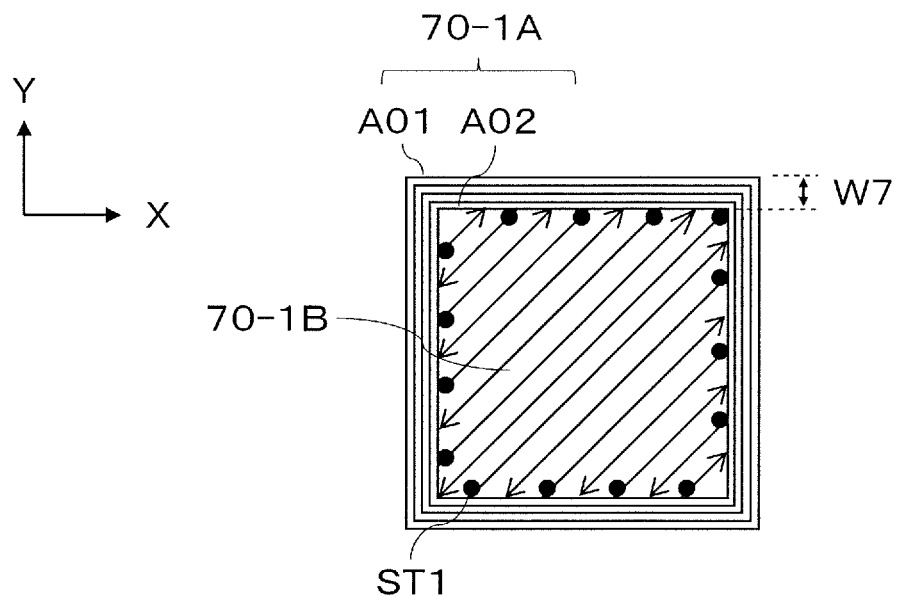
FIG. 7A is a schematic plan view illustrating a method for scanning an energy beam on one layer of a first embodiment.
Figure 7B:
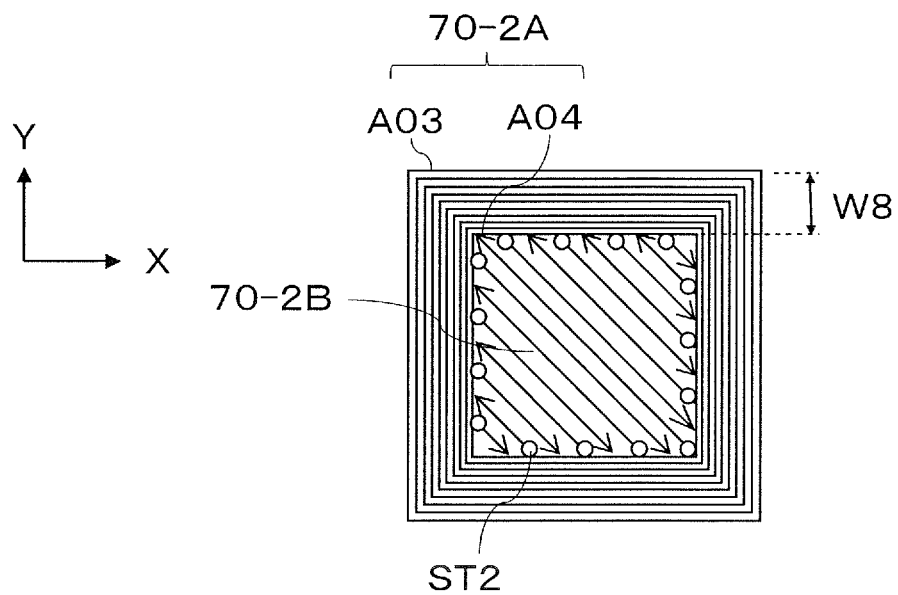
FIG. 7B is a schematic plan view illustrating a method for scanning the energy beam on another one layer of the first embodiment.

A method for scanning the energy beam used in the present embodiment will be described with reference to FIG. 7. FIG. 7A is a schematic plan view illustrating a layer in which a width of a contour area is W7 and FIG. 7B is a schematic plan view illustrating another layer in which a width of a contour area is W8. These layers are vertically continuous (however, W7<W8).

At first, the method for scanning the energy beam to the contour area 70-1A in FIG. 7A will be described. As illustrated in FIG. 7A, the energy beam is irradiated along five scan lines in the contour area 70-1A from an outermost contour line A01 to an innermost contour line A02. Because a laser beam whose spot diameter is 50 μm is used and a pitch between the scan lines is set at 50 μm, the contour area having a width of about 250 μm is scanned.

Next, the energy beam is scanned to the inner-solid area 70-1B in FIG. 7A such that the energy beam reciprocates in parallel along a direction inclined by 45 degrees counterclockwise with respect to the X direction. Points indicated by black circles in FIG. 7A are irradiation starting points ST1 of the energy beam and are located inside of the innermost contour line A02 by 50 μm along the boundary between the contour area and the inner-solid area.

Next, the method for scanning the energy beam to the contour area 70-2A in FIG. 7B will be described. As illustrated in FIG. 7B, the energy beam is irradiated along ten scan lines in the contour area 70-2A from an outermost contour line A03 to an innermost contour line A04. Because a laser beam whose spot diameter is 50 μm is used and a pitch between the scan lines is set at 50 μm, the contour area having a width of about 500 μm is scanned.

It is noted that although not illustrated, the irradiation starting points of the respective scan lines of the contour areas 70-1A and 70-2A are disposed such that the irradiation starting points are separated among the upper and lower layer so that the irradiation starting points of the scan lines of the upper and lower layers do not overlap.

Next, the energy beam is scanned to the inner-solid area 70-2B in FIG. 7A such that the energy beam reciprocates in parallel along a direction inclined by 135 degrees counterclockwise with respect to the X direction. Points indicated by white circles in FIG. 7B are irradiation starting points ST2 of the energy beam and are located inside of the innermost contour line A04 by 50 μm along the boundary between the contour area and the inner-solid area.

Such scanning method permits to separate the irradiation starting points of the inner-solid areas of the upper and lower layers by 250 μm.

It is noted that a reason why the scanning direction of the inner-solid area is turned by 90 degrees among the upper and lower layers is to disperse heating history of the irradiation of the energy beam and to prevent warping and the like of the shaped object. Although the scanning angle of the first layer is inclined by 45 degrees counterclockwise with respect to the X direction in the present embodiment, the scanning angle may be set at an arbitrary angle such as 0 degree and 90 degrees.

The instruction set for executing the scanning method described above is prepared and is stored in the RAM of the control portion 15.

Next, the control portion 15 operates the respective portions of the apparatus in accordance to the instruction set in Steps S5 through S8 to shape the object.

At first, the control portion 15 sets the shaping stage 3 at a predetermined height and drives the squeegee 5 to deposit one layer of powder layer in Step S5. In the apparatus of the present embodiment, a thickness of one layer is set at 50 μm. SUS316L metal powder having an average particle size of 20 μm is used as the powder.

It is noted that the powder used as the base material is not limited to that and may be what in which powder selected from nickel powder, nickel alloy powder, copper powder, copper alloy powder, graphite power or the like is blended with main component of powder of iron material for example.

Next, the control portion 15 drives the laser source 9, the galvanic scanner 10 and the condenser lens 11 to scan and irradiate the energy beam to the contour area in Step S6. After melting the powder, the molten powder is cooled to solidify and to form the contour area. It is noted that cooling here may be natural cooling after irradiating and scanning the energy beam or may be forced cooling conducted by blowing cold air for example.

Next, the control portion 15 drives the laser source 9, the galvanic scanner 10 and the condenser lens 11 to scan and irradiate the energy beam to the inner-solid area to melt the powder in Step S7. After melting the powder, molten powder is cooled to solidify and to form the inner-solid area. It is noted that cooling here may be natural cooling after irradiating and scanning the energy beam or may be forced cooling conducted by blowing cold air for example.

In Step S8, the control portion 15 confirms whether the formation of all layers has been completed, and if it is not completed yet, the control portion 15 returns to Step S5 to form a next layer. At that time, the shaping stage 3 is lowered by the thickness of one layer to form the powder layer again by the squeegee 5. If the formation of all layers has been completed, the control portion 15 ends the additive manufacturing process.

According to the additive manufacturing method of the present embodiment, it is possible to suppress the accumulation of the bumps because energy beam is scanned such that the irradiation starting points of the energy beam do not overlap among the vertically neighboring layers both in the contour area and the inner-solid area.

Figure 10A:
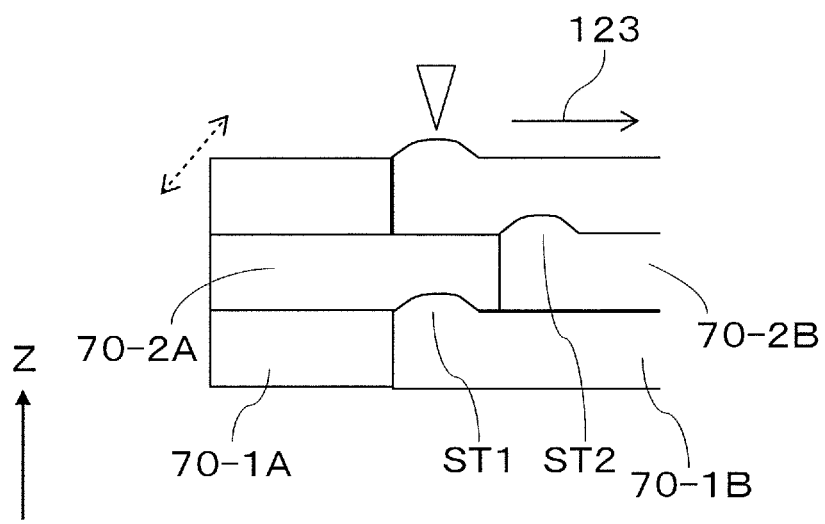
FIG. 10A is a schematic section view illustrating a shape of a shaped object of the first embodiment.

In particular, it is possible to suppress the accumulation of the bumps at the boundary between the contour area and the inner-solid area because the shapes of the respective areas are set such that the boundary of the contour area and the inner-solid area do not overlap among the vertically neighboring layers. FIG. 10A is a schematic section view illustrating a partial cross-sectional shape of an end portion of the three-dimensional shaped object. In FIG. 10A, a dotted arrow indicates the scanning direction of the energy beam in forming the contour area and a reference numeral 123 indicates the scanning direction of the energy beam in forming the inner-solid area of an odd-number-th layer. Because the irradiation starting point ST1 of the energy beam of the inner-solid area 70-1B does not overlap vertically with the irradiation starting point ST2 of the energy beam of the inner-solid area 70-2B, the bumps are suppressed from being accumulated. Still further, because the bump at the irradiation starting point ST1 of the energy beam of the inner-solid area 70-1B is heated in forming the contour area 70-2A of the upper layer, this arrangement brings about an effect of reducing the height of the bump.

As described above, according to the present embodiment, it is possible to suppress a large projection from being generated in the lamination direction of the three-dimensional shaped object in shaping the three-dimensional shaped object by the powder lamination melting method. Due to that, it is possible to prevent the projection from interfering with the squeegee in depositing the powder and to improve form accuracy of the three-dimensional shaped object.

Second Embodiment

Next, a manufacturing method of a three-dimensional shaped object and an additive manufacturing apparatus of a second embodiment of the present disclosure will be described with reference to the drawings.

Additive manufacturing apparatus

The additive manufacturing apparatus constructed as illustrated in FIGS. 1 and 2 will be used also in a second embodiment similarly to the first embodiment. Detailed description of the apparatus will be omitted here to avoid overlapped description.

Additive Manufacturing Process

While the additive manufacturing process is performed along the flowchart in FIG. 3 also in the second embodiment, an energy beam irradiation method is different from that of the first embodiment. Therefore, contents of the shaping instruction set prepared in Step S4 and the spot diameter and the scanning pitch of the energy beam in forming the contour area in Step S6 are different from those of the first embodiment, so that those differences will be mainly described below.

Figure 8A:
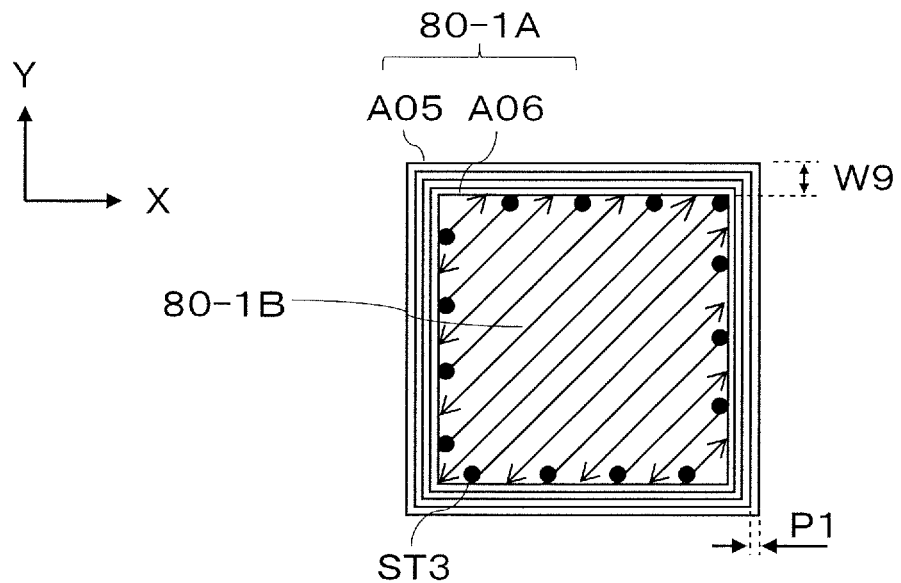
FIG. 8A is a schematic plan view illustrating a method for scanning an energy beam on one layer of a second embodiment.
Figure 8B:
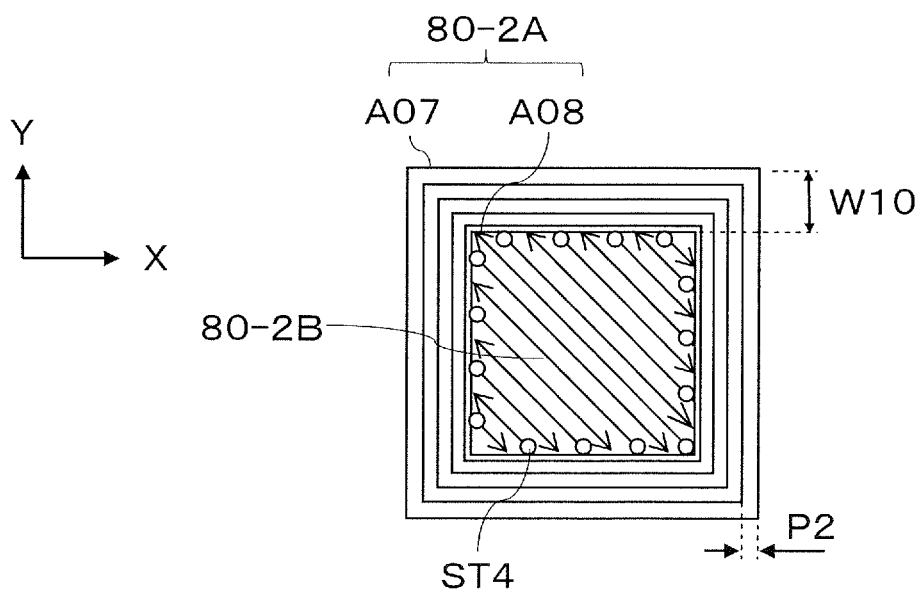
FIG. 8B is a schematic plan view illustrating a method for scanning the energy beam on another one layer of the second embodiment.

Although the instruction set for executing the scanning operation of the energy beam as illustrated in FIGS. 7A and 7B has been prepared in Step S4 in the first embodiment, an instruction set for executing a scanning operation of the energy beam as illustrated in FIGS. 8A and 8B is prepared in the second embodiment.

FIG. 8A is a schematic plan view illustrating a layer in which a width of a contour area is W9 and FIG. 8B is a schematic plan view illustrating a layer in which a width of a contour area is W10. These layers are vertically continuous (however w9<W10).

At first, the method for scanning the energy beam to the contour area 80-1A in FIG. 8A will be described. As illustrated in FIG. 8A, the energy beam is irradiated along five scan lines in the contour area 80-1A from an outermost contour line A05 to an innermost contour line A06. Because a laser beam whose spot diameter is 50 μm is used and a pitch between the scan lines P1 is set at 50 μm, the contour area having a width of about 250 μm is scanned.

Next, the energy beam is scanned to the inner-solid area 80-1B in FIG. 8A such that the energy beam reciprocates in parallel along a direction inclined by 45 degrees counterclockwise with respect to the X direction. Points indicated by black circles in FIG. 8A are irradiation starting points ST3 of the energy beam and are located inside of the innermost contour line A06 by 50 μm along the boundary between the contour area and the inner-solid area.

Next, the method for scanning the energy beam to the contour area 80-2A in FIG. 8B will be described. As illustrated in FIG. 8B, the energy beam is irradiated along five scan lines in the contour area 80-2A from an outermost contour line A07 to an innermost contour line A08. Because a laser beam whose spot diameter is 100 µm is used and a pitch P2 between the scan lines is set at 100 µm, the contour area having a width of about 500 µm is scanned. Thus, the present embodiment is different from the first embodiment in that the energy beam is irradiated by changing the spot diameter of the energy beam and the scanning pitch among the contour areas of the upper and lower layers.

It is noted that among the respective scan lines of the contour areas 80-1A and 80-2A, although not illustrated, the scanning starting points are disposed so as to be separated among the upper and lower layer such that the irradiation starting points of the scan lines of the upper and lower layers do not overlap.

Next, the energy beam is scanned to the inner-solid area 80-2B in FIG. 8B such that the energy beam reciprocates in parallel along a direction inclined by 135 degrees counter-clockwise with respect to the X direction. Points indicated by white circles in FIG. 8B are irradiation starting points ST4 of the energy beam and are located inside of the innermost contour line A08 by 50 µm along the boundary among the contour area and the inner-solid area.

Such scanning method permits to separate the irradiation starting points of the inner-solid areas of the upper and lower layers by 250 µm.

The instruction set for executing the scanning method described above is prepared and is stored in the RAM of the control portion 15 in Step S4.

According to the second embodiment, the condenser lens 11 is defocused to enlarge the spot diameter of the beam in forming the 80-2A layer as compared to that in forming the 80-1A layer in irradiating the energy beam to form the contour areas in Step S6. At that time, it is preferable to increase a power of the laser source 9 such that the powder layer can be heated with equal power density even if the 80-2A layer is scanned at equal speed with that in forming the 80-1A layer by using the galvanic scanner 10. Or, even though it takes time, it is also possible to arrange such that the powder layer can be heated with equal power density without changing the power of the laser source 9 by lowering the scanning speed of the galvanic scanner 10.

According to the additive manufacturing method of the second embodiment, it is possible to suppress the accumulation of the bumps because energy beam is scanned such that the irradiation starting points of the energy beam do not overlap among the vertically neighboring layers both in the contour area and in the inner-solid area.

In particular, it is possible to suppress the accumulation of the bumps at the boundary between the contour area and the inner-solid area because the shapes of the respective areas are set such that the boundary of the contour area and the inner-solid area do not overlap among the vertically neighboring layers. As described above, according to the present embodiment, it is possible to suppress a large projection from being generated in the lamination direction of the three-dimensional shaped object in shaping the three-dimensional shaped object by the powder lamination melting method. Due to that, it is possible to prevent the projection from interfering with the squeegee in depositing the powder and to improve form accuracy of the three-dimensional shaped object.

Third Embodiment

Next, a manufacturing method of a three-dimensional shaped object and an additive manufacturing apparatus of a third embodiment of the present disclosure will be described with reference to the drawings.

Additive manufacturing apparatus

The additive manufacturing apparatus constructed as illustrated in FIGS. 1 and 2 will be used also in the third embodiment similarly to the first embodiment. Detailed description of the apparatus will be omitted here to avoid overlapped description.

Additive Manufacturing Process

While the additive manufacturing process is performed along the flowchart in FIG. 3 also in the third embodiment, an energy beam irradiation method is different from that of the first embodiment. Therefore, contents of the shaping instruction set prepared in Step S4 and the irradiation starting point of the scan line in forming the inner-solid area in Step S7 are different from those of the first embodiment, so that these differences will be mainly described below.

Figure 9A:
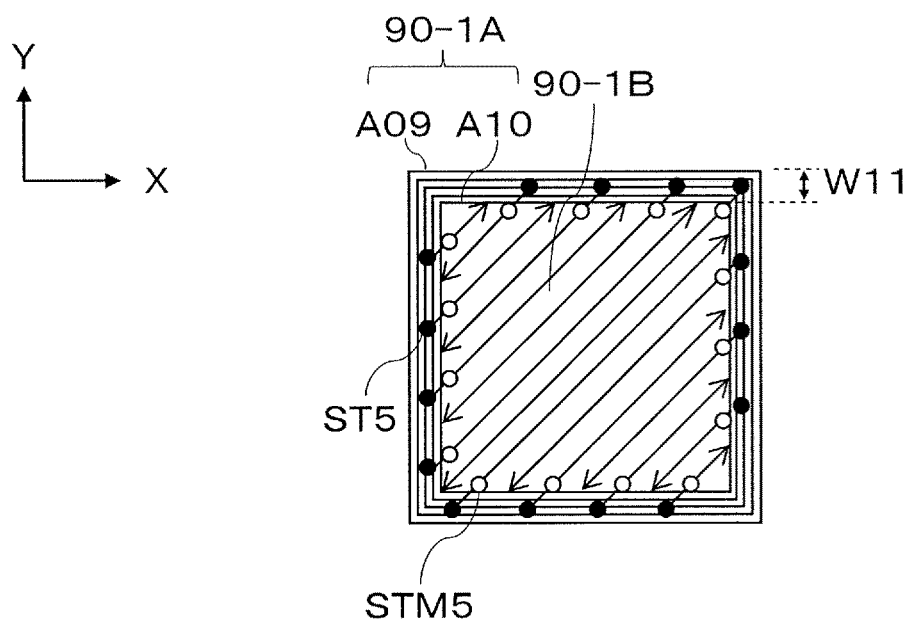
FIG. 9A is a schematic plan view illustrating a method for scanning an energy beam on one layer of a third embodiment.
Figure 9B:
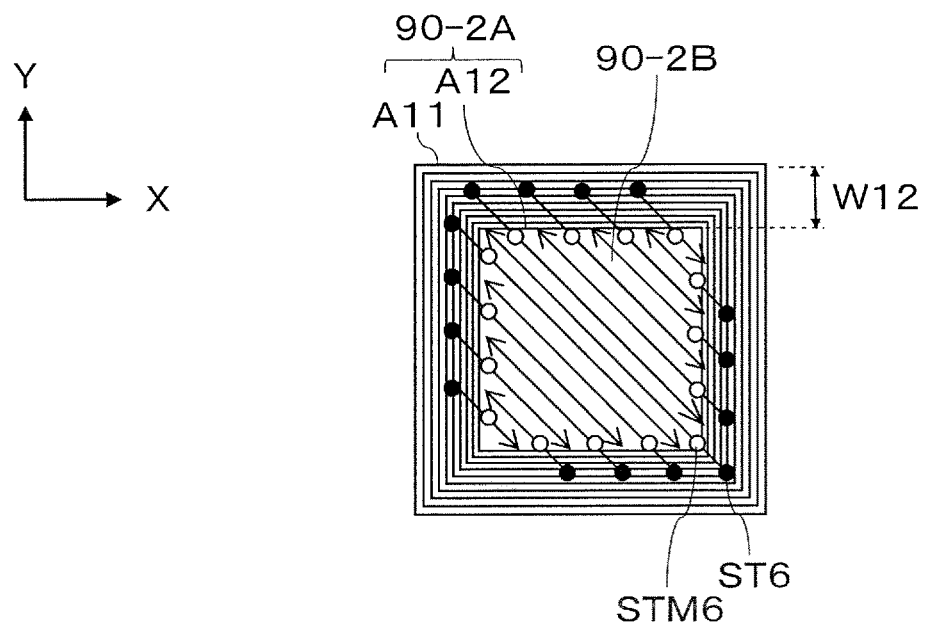
FIG. 9B is a schematic plan view illustrating a method for scanning the energy beam of another one layer of the third embodiment.

Although the instruction set for executing the scanning operation of the energy beam as illustrated in FIGS. 7A and 7B has been prepared in Step S4 in the first embodiment, an instruction set for executing a scanning operation of the energy beam as illustrated in FIGS. 9A and 9B is prepared in the third embodiment.

FIG. 9A is a schematic plan view illustrating a layer in which a width of a contour area is W11 and FIG. 9B is a schematic plan view illustrating another layer in which a width of a contour area is W12. These layers are vertically continuous (however w11<W12).

At first, the method for scanning the energy beam to the contour area 90-1A in FIG. 9A will be described. As illustrated in FIG. 9A, the energy beam is irradiated along five scan lines in the contour area 90-1A from an outermost contour line A09 to an innermost contour line A10. Because a laser beam whose spot diameter is 50 µm is used and a pitch between the scan lines is set at 50 µm, the contour area having a width of about 250 µm is scanned.

Next, the energy beam is scanned to the inner-solid area 90-1B in FIG. 9A such that the energy beam reciprocates in parallel along a direction inclined by 45 degrees counter-clockwise with respect to the X direction. Points indicated by black circles in FIG. 9A are irradiation starting points ST5 of the energy beam and are located outside of the innermost contour line A10 by 100 µm, i.e., within the contour area 90-1A, along the boundary between the contour area and the inner-solid area. The point that the irradiation of the energy beam is started within the contour area already melted and solidified is different from the first embodiment. The energy beam scanned from the irradiation starting point ST5 irradiates a non-melt powder area from STM5 which is an end portion of the inner-solid area. Advantageous effects of such scanning method will be described later.

Next, the method for scanning the energy beam to the contour area 90-2A in FIG. 9B will be described. As illustrated in FIG. 9B, the energy beam is irradiated along ten scan lines in the contour area 90-2A from an outermost contour line A11 to an innermost contour line A12. Because a laser beam whose spot diameter is 50 µm is used and a pitch between the scan lines is set at 50 µm, the contour area having a width of about 500 µm is scanned.

It is noted that in the respective scan lines of the contour areas 90-1A and 90-2A, although not illustrated, the scanning starting points are disposed so as to be separated among the upper and lower layer such that the irradiation starting points of the scan lines of the upper and lower layers do not overlap.

Next, the energy beam is scanned to the inner-solid area 90-2B in FIG. 9B such that the energy beam reciprocates in parallel along a direction inclined by 135 degrees counter-clockwise with respect to the X direction. Points indicated by black circles in FIG. 9B are irradiation starting points ST6 of the energy beam and are located outside of the innermost contour line A12 by 250 μm, i.e., within the contour area 90-2A, along the boundary between the contour area and the inner-solid area. The point that the irradiation of the energy beam is started within the contour area already melted and solidified is different from the first embodiment. The energy beam scanned from the irradiation starting point ST6 irradiates a non-melt powder area from STM6 which is an end portion of the inner-solid area. Advantageous effects of such scanning method will be described below.

Such scanning method permits to separate STM 5 and STM 6 which are substantially the irradiation starting points of the inner-solid areas of the upper and lower layers by 250 μm.

The instruction set for executing the scanning method described above is prepared and is stored in the RAM of the control portion 15 in Step S4.

According to the additive manufacturing method of the third embodiment, it is possible to suppress the accumulation of the bumps because energy beam is scanned such that the irradiation starting points of the energy beam do not overlap among the vertically neighboring layers both in the contour area and in the inner-solid area.

Figure 10B:
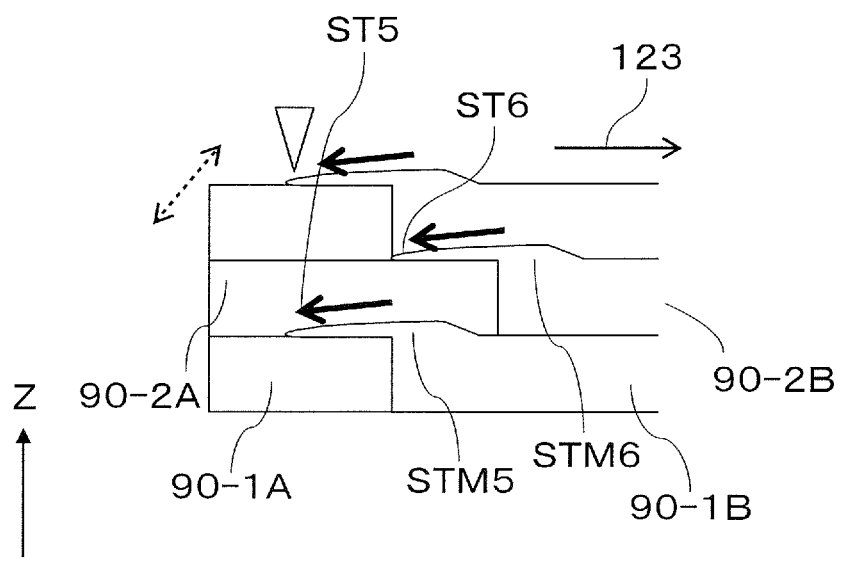
FIG. 10B is a schematic section view illustrating a shape of a shaped object of the third embodiment.

In particular, it is possible to suppress the accumulation of the bumps at the boundary between the contour area and the inner-solid area because the shapes of the respective areas are set such that the boundary of the contour area and the inner-solid area do not overlap among the vertically neighboring layers. FIG. 10B is a schematic section view illustrating a partial cross-sectional shape of an end portion of the three-dimensional shaped object of the present embodiment. In FIG. 10B, a dotted arrow indicates the scanning direction of the energy beam in forming the contour area and a reference numeral 123 indicates the scanning direction of the energy beam in forming the inner-solid area of an odd-number-th layer. Because the substantial irradiation starting point STM5 of the energy beam of the inner-solid area 90-1B does not overlap vertically with the substantial irradiation starting point STM6 of the energy beam of the inner-solid area 90-2B, the bumps are suppressed from being accumulated.

Still further, according to the present embodiment, the bump at the substantial irradiation starting point STM5 can be effectively suppressed by placing the irradiation starting point ST5 of the energy beam in forming the inner-solid area 90-1B within the contour area 90-1A which has been already melted and solidified. Although a portion of the already melted and solidified part melts again if the energy beam is irradiated from the irradiation starting point ST5 within the contour area 90-1A, an increase of temperature is small because thermal conductivity of the already bulked part is high and a re-melting amount is relatively small. Then, while powder is heated and melts as the irradiation point moves from the contour area 90-1A to the inner-solid area 90-1B, the molten material around the substantial irradiation starting point STM5 is connected with the re-melt area or a melt pool within the contour area 90-1A and the molten material diffuses. Due to that, the bump around the approximate irradiation starting point STM5 can be suppressed. In the same manner, a bump of a molten material around the approximate irradiation starting point STM6 can be suppressed also in a case of starting the irradiation from the irradiation starting point ST6 within the layer 90-2A.

As compared to the first embodiment which has been conducted under the same condition other than that the irradiation starting point of the inner-solid area is different, while the bump around the irradiation starting point is suppressed to 110 μm in the first embodiment, the bump can be suppressed to about 80 μm in the third embodiment.

As described above, it is possible to suppress the bumps from accumulating at the boundary between the contour area and the inner-solid area also in the present embodiment because the shapes of the areas are set such that the boundaries of the contour area and the inner-solid area do not overlap among the vertically neighboring layers. Still further, it is possible to effectively suppress the bump by starting the irradiation of the energy beam from the contour area already melted and solidified.

As described above, according to the present embodiment, it is possible to suppress a large projection from being generated in the lamination direction of the three-dimensional shaped object in shaping the three-dimensional shaped object by the powder lamination melting method. Due to that, it is possible to prevent the projection from interfering with the squeegee in depositing the powder and to improve form accuracy of the three-dimensional shaped object.

Other Embodiment

An embodiment of the present disclosure is not limited to the first through third embodiments described above and may be appropriately modified or combined.

For instance, although the plurality of scan lines having the different beam spot diameters is used among the upper and lower layers in forming the contour areas in the second embodiment, the beam may be irradiated by only one scan line whose beam spot diameter is different along the contour line.

Still further, although the laser source has been used as the light source for heating the laid base powder in the embodiments described above, the light used here needs not be always the laser light as long as the light is what irradiation energy density can be controlled or can be scanned. For instance, in some cases, it is also possible to use an irradiation optical system in which optical elements such as a high intensity lamp, a shutter, a variable focus lens, and a scanning mirror are combined. Or, it may be an electron beam.

Still further, the base powder is not limited to be metal powder and may be powder of resin such as ABS and PEEK. The particle size is not also limited to those described above in the embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-011509, filed Jan. 25, 2017, which is hereby incorporated by reference wherein in its entirety.

What is claimed is:

1. A manufacturing method of a three-dimensional shaped object, comprising:
  a first step of depositing powder to form a powder layer; and
  a second step of scanning and irradiating an energy beam to the powder layer to melt and then solidifying the powder layer to form a solidified layer,
  wherein the energy beam is irradiated to a part of the powder layer corresponding to either one area among a contour area including a surface of the shaped object and an inner area inside of the contour area in advance and the energy beam is irradiated to a part of the powder layer corresponding to another area later,
  wherein the first and second steps are alternately and repeatedly executed to form a three-dimensional shaped object by laminating a plurality of solidified layers,
  wherein an upper solidified layer is a subsequent layer to a lower solidified layer and is in contact with the lower solidified layer,
  wherein the energy beam is scanned such that an irradiation starting point of the energy beam for forming the upper solidified layer among the plurality of laminated solidified layers does not overlap with an irradiation starting point of the energy beam for forming the lower solidified layer in a view from a lamination direction, and
  wherein the energy beam is scanned such that widths of contour areas of the upper and lower solidified layers are differentiated in a case where $t/\tan\theta$ is smaller than a spot diameter of the energy beam or in a case where $t/\tan\theta$ is 0.2 mm or less, where $\theta$ is an angle formed between a side surface of the three-dimensional shaped object and a main surface of the solidified layer and $t$ is a thickness of one layer of the solidified layers.

2. The manufacturing method of the three-dimensional shaped object according to claim 1, wherein a spot diameter of the energy beam for forming the contour area included in the upper solidified layer is differentiated from a spot diameter of the energy beam for forming the contour area included in the lower solidified layer.

3. The manufacturing method of the three-dimensional shaped object according to claim 1, wherein a number of scan lines of the energy beam for forming the contour area included in the upper solidified layer is differentiated from a number of scan lines of the energy beam for forming the contour area included in the lower solidified layer.

4. The manufacturing method of the three-dimensional shaped object according to claim 1, wherein a scanning direction of the energy beam for forming the inner area included in the upper solidified layer is differentiated from a scanning direction of the energy beam for forming the inner area included in the lower solidified layer.

5. The manufacturing method of the three-dimensional shaped object according to claim 1, wherein the contour area is formed in advance of the inner area in forming the solidified layer and an irradiation starting point of the energy beam in forming the inner area is placed within the contour area formed in advance.

6. The manufacturing method of the three-dimensional shaped object according to claim 1, wherein the energy beam is scanned such that the boundary between the contour area and the inner area included in the upper solidified layer is separated from the boundary between the contour area and the inner area included in the lower solidified layer by a distance greater than four times of the spot diameter of the energy beam in the view from the lamination direction.

7. An additive manufacturing apparatus for a three-dimensional shaped object, comprising:
  a powder layer forming portion configured to deposit powder to form a powder layer;
  an energy beam irradiating portion configured to scan and irradiating an energy beam to the powder layer to form a solidified layer; and
  a controller configured to control the powder layer forming portion and the energy beam irradiating portion to form and laminate a plurality of solidified layers,
  wherein the controller is configured to control such that either one area among a contour area including a surface of the three-dimensional shaped object and an inner area inside of the contour area is formed in advance and such that the other area is formed later,
  wherein an upper solidified layer is a subsequent layer to a lower solidified layer and is in contact with the lower solidified layer,
  wherein the controller is configured to control such that the energy beam irradiating portion scans the energy beam such that an irradiation starting point of the energy beam for forming the upper solidified layer among the plurality of solidified layers does not overlap with an irradiation starting point of the energy beam for forming the lower solidified layer in a view from a lamination direction, and
  wherein the energy beam irradiating portion is configured to scan the energy beam such that widths of contour areas of the upper and lower solidified layers are differentiated in a case where $t/\tan\theta$ is smaller than a spot diameter of the energy beam or in a case where $t/\tan\theta$ is 0.2 mm or less, where $\theta$ is an angle formed between a side surface of the three-dimensional shaped object and a main surface of the solidified layer and $t$ is a thickness of one layer of the solidified layers.

8. The additive manufacturing apparatus according to claim 7, wherein a distance between a boundary line of the upper layer and a boundary line of the lower layer is larger than four times of the spot diameter of the energy beam in the view from the lamination direction.

* * * * *